Jan. 16, 1968 R. HÖRNER 3,364,309

CONFERENCE CALL CIRCUITS

Filed June 9, 1964 2 Sheets-Sheet 1

United States Patent Office 3,364,309
Patented Jan. 16, 1968

3,364,309

CONFERENCE CALL CIRCUITS

Roland Hörner, Wilfredingen, near Pforzheim, Germany, assignor to International Standard Electric Corporation, New York, N.Y., a corporation of Delaware Filed June 9, 1964, Ser. No. 373,772
Claims priority, application Germany, June 22, 1963, St 20,763
3 Claims. (Cl. 179—1)

ABSTRACT OF THE DISCLOSURE

A conference call circuit comprising a plurality of amplifiers connected in series to form a ring. The subscribers are coupled into the ring using individual transformers connected between the amplifiers.

The present invention relates in general to conference call circuits and in particular, to conference call circuits for connecting several two-wire subscribers for performing duplex operations when all of the subscriber stations are equally restricted, i.e. none of the subscriber stations has a right-of-way or priority over any other subscriber station.

Among the problems inherent in connecting a plurality of subscriber stations into a conference call circuit are the loss of amplitude level, the mismatch at subscriber station input and output and the decrease of power efficiency. All of these problems tend to increase as additional subscriber stations are connected into the circuit.

One conference network designed to solve the aforementioned problems has already been proposed in which for each subscriber's line there are provided two amplifiers arranged in series. The series arrangement provides voltage-amplification factors that are smaller than unity, and provide inputs that are high-ohmic with outputs that are low ohmic. The arrangement discloses the input and output pair of the series amplifiers applied to the secondary winding of a transformer terminating the respective subscriber's line, while the other input and output pairs of the series amplifiers are all connected to one another.

The noted proposed solution is relatively expensive and complicated in that, among other things, two amplifiers are required for each subscriber's line. The present invention proposes a conference network having the same properties, but which is of a more simple design.

It is an object of the present invention to provide new and unique conference call circuitry.

Another object of the present invention is to provide conference call circuitry for interconnecting a plurality of two-wire subscriber stations without any notable loss of signal level or impedance mismatch.

In accordance with one aspect of this invention these and other objects are accomplished by providing conference call circuitry wherein a number of series connected amplifiers corresponding to the number of subscribers, are connected together in a ring circuit. Each subscriber's line is branched through an individual transformer from each connecting point between two amplifiers.

The invention will now be explained in detail with reference to the accompanying drawings, in which.

Figure 1:
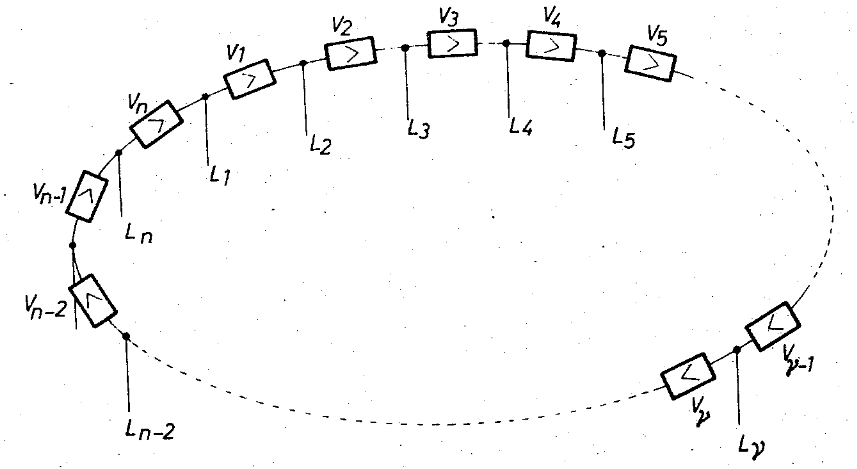
FIG. 1 shows the basic block diagram of the invention.

Referring to FIG. 1, therein is shown a plurality of series connected amplifiers ranging from amplifier $V_1$ to amplifier $V_n$. The output of the last amplifier $V_n$ is connected to the input of the first amplifier $V_1$ to form a ring circuit. The transmission factor of the ring at each of the amplifiers is (1) one. The subscribers' lines $L_1$ to $L_n$ branch off from the connecting points between the individual amplifiers.

Figure 2:
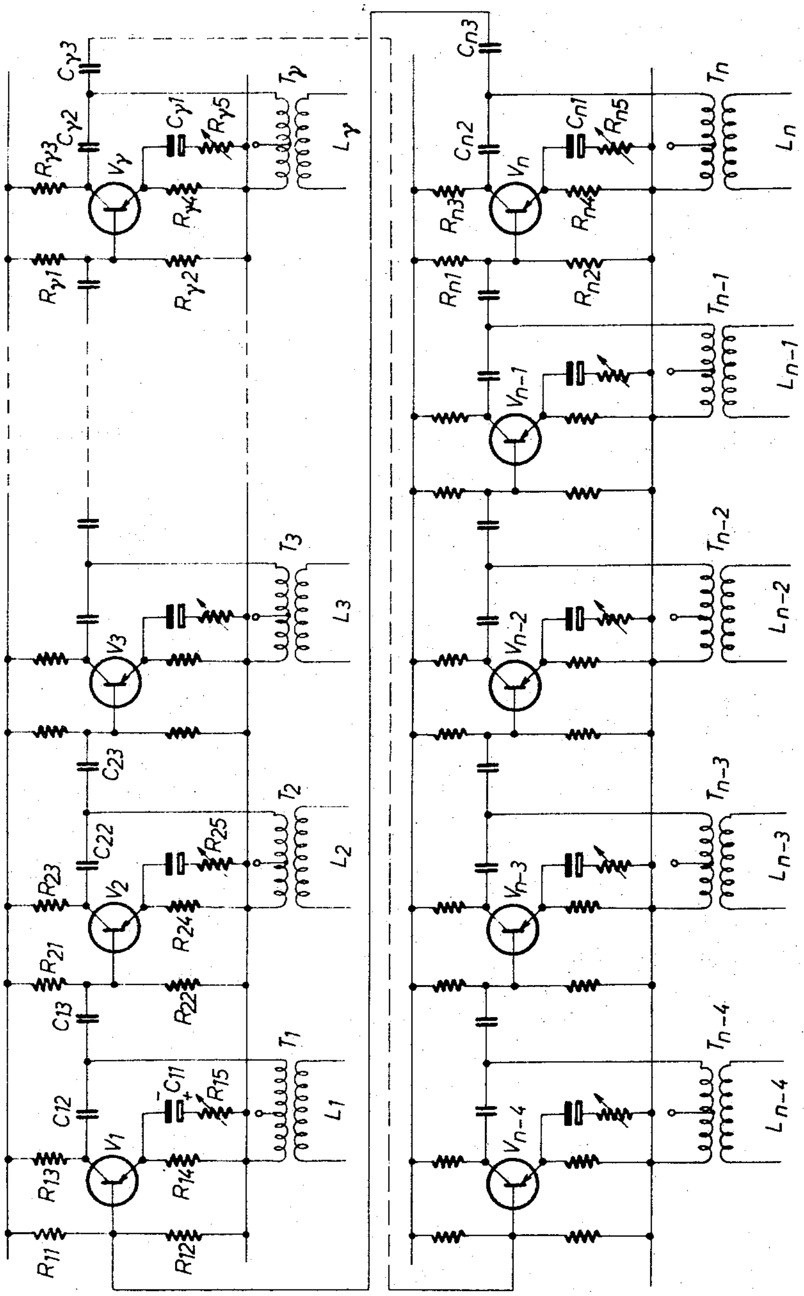
FIG. 2 shows the schematic diagram of an exemplified embodiment of the invention.

As can best be seen in FIG. 2, one amplifier is assigned to each subscriber set. The transmission factor of the output at a loaded matching transformer and the input at a connected return lead of the last to the first amplifier equals 1. Without a matching transformer, each amplifier has an output resistance resulting from the combination of the respective operating load resistance $R\gamma_3$, the respective current feedback resulting from the parallel connection of the resistor $R\gamma_4$ and the capacitor $C\gamma_1$ arranged in series with the resistor $R\gamma_5$, and from the common voltage return from the output of the last to the input of the first amplifier. This output or input resistance respectively is transformed by the transformers $T_1$, $T_2$ . . . $T_n$ to the desired characteristic impedance of the connected lines $L_1$, $L_2$ . . . $L_n$.

When a voltage U reaches the primary side (subscriber's line side) of the transformer $T_1$, it is transformed in accordance with the transformer ratio $ü$, and is fed, via the capacitor $C_{13}$, to the input of the amplifier $V_2$, and is applied at an amplification to assure that the above noted transmission factor $K=1$ then, to the capacitor $C_{22}$ with the same amplitude as to the capacitor $C_{13}$. In a like manner the voltage signal is transmitted via the capacitor $C_{23}$ and via the amplifiers $V_3$, $V_4$ . . . to the amplifier $V_n$ where it re-appears at the capacitor $C_{n3}$ with the same amplitude as at the capacitor $C_{13}$, to be superimposed upon the original input voltage. The circuit amplification of each amplifier, when serving a line transformer receiving a superimposed voltage, is caused to be somewhat reduced because each transformer is connected to assure that the voltage imposed on each amplifier by the transformer of its output reduces the gain at the amplifier energized by the superimposed voltage. The signal appearing at $C_{22}$, $C_{32}$ . . . $C_{n2}$ is then transformed in accordance with the transformer ratio $ü$ of the transformer, and will appear at the terminal resistance of the transformers $T_2$, $T_3$ . . . $T_n$ with about the same amplitude as was fed in at the transformer $T_1$.

While the principles of the invention have been described above in connection with specific apparatus and applications, it is to be understood that this description is made only by way of example and not as a limitation on the scope of the invention.

What is claimed is:

1. A conference call circuit for interconnecting a plurality of subscriber stations comprising an amplifier associated with each of said stations, means for series coupling the output of each of said amplifiers to the input of the succeeding one of said amplifiers to form a ring circuit for transferring signals originating at one of said amplifiers through all of the other amplifiers, transformer means associated with each amplifier, said transformer means having a primary and a secondary winding, means for connecting the coupling points between adjacent amplifiers to the secondary winding of said associated transformer means, means for connecting subscriber lines leading to said stations to the primary winding of each of said transformers whereby a voltage is generated on the secondary winding responsive to signals on the primary winding, said amplifiers comprising active transistor elements, load resistor means connecting the collector of said transistor elements to a voltage source, current feedback means connected between the emitter of said transistor elements, and an opposite voltage source and means for connecting said transformer to the amplifier before the associated amplifier to oppose the voltage arriving from the originating associated amplifier thereby lowering the gain of each of said amplifiers responsive to a signal applied to the said primary winding of said associated transformer means.

2. The circuitry of claim 1 wherein said amplifiers consist of single transistors arranged in a common emitter configuration.

3. The circuit of claim 2 wherein said means for series coupling said amplifier comprises capacitors connected in series between the collector of the prior one of said transistors of said series amplifiers and a base of the said transistor of the next series amplifier, and means for connecting said secondaries of said transformers between the coupling point of said capacitors across said current feedback to said opposite voltage source.

References Cited

UNITED STATES PATENTS

| | | | |
|---|---|---|---|
| 2,166,529 | 7/1939 | Langevin | 179—1 |
| 2,461,945 | 2/1949 | Tschumi | 179—1 |
| 3,238,302 | 3/1966 | Curchack | 179—1 |

KATHLEEN H. CLAFFY, *Primary Examiner.*

A. H. GESS, *Assistant Examiner.*